Figure 1:
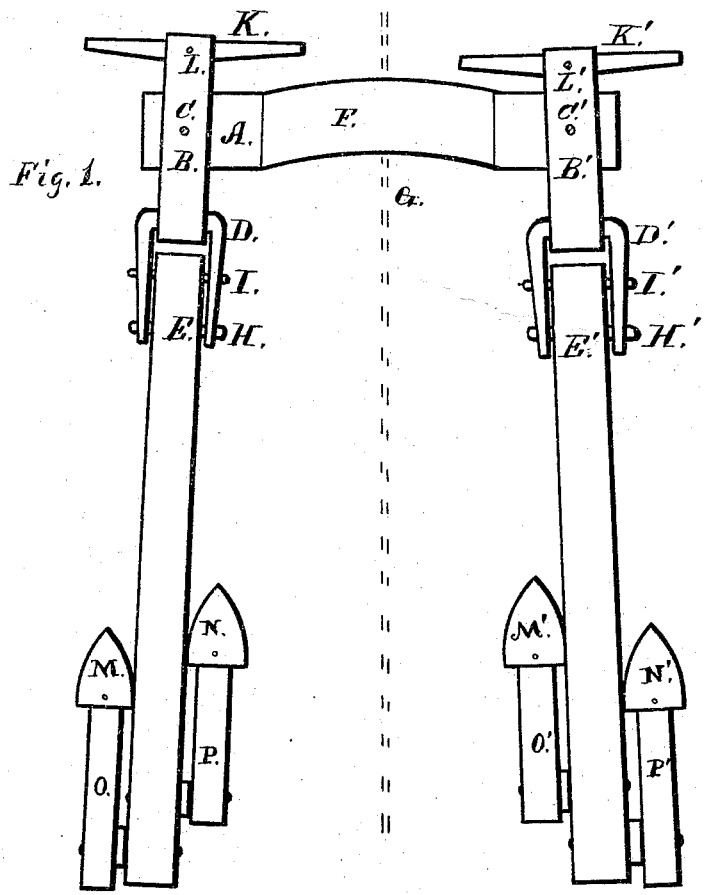

I. N. CAUTHORN.
Cultivators.

No. 134,732.  Patented Jan. 14, 1873.

Witness:
Erie J. Leech,
R. M. Marshall

Inventor:
Isaac Newton Cauthorn,
By Saml. J. Wallace
Attorney

UNITED STATES PATENT OFFICE.

ISAAC N. CAUTHORN, OF CARTHAGE, ILLINOIS.

IMPROVEMENT IN CULTIVATORS.

Specification forming part of Letters Patent No. 134,732, dated January 14, 1873.

*To all whom it may concern:*

Be it known that I, ISAAC NEWTON CAUTHORN, of Carthage, Hancock county, Illinois, have made a new and useful Improvement in Plows, of which the following is a specification:

The object of this invention is to make more cheap and simple the parts required in plows and cultivators where two beams are connected and drawn by one team, each having separate free lateral motion for its plows or cultivators, and holding them upright in use.

Figure 1 is a top view of the parts peculiar to the invention as in use.

Plows and cultivators have been connected in pairs and drawn by one team, and arranged for each beam to have separate free lateral motions for its plows, and hold them upright in use, using one general plan variously modified. This plan has been to attach each beam by joints to a frame having a tongue projecting forward between the horses to guide it. This has required a frame-work to brace the tongue to the parts to which the plows were attached, and has required separate operating parts to form a double-tree or evener between the horses. All of this has made a complex mass of parts, and has taken large wheels to carry it. These parts have made the larger portion of the cost of such implements to farmers, has made a disadvantage in operating them, and made liabilities of wear and tear and keeping it all in order for use.

To avoid all this, this invention dispenses with the guiding-tongue and all its framework, and arranges instead as follows:

The plow or cultivator beams E E', instead of being attached to a separate part, are attached directly to part A, which acts as the double-tree or evener of draft. This dispenses with one system of cross-parts, and enables that used to be made in the most simple form, as shown. When used in cultivators this part A is arched in its center F to pass over a line of plants on line G. The horses are attached by single-trees K K' to the ends of the beams, as shown, to part A, or in any suitable way. The beams E E' are attached to part A by double hinge-jointed parts C C', one joint giving vertical and the other lateral motion to each beam, arranged for each joint to act separate and free and hold the beams from twisting in relation to part A, to hold the plows or cultivators upright in use; and each beam acting to hold up an end of part A, so as to sustain each other.

The distance of the plows apart is varied by changing the relations of the beams on part A.

Either gang or breaking plows or cultivators are used on the beams E E', and any suitable handle for guiding them.

I claim—

The plow or cultivator beams E E' attached directly to part A, which acts as the double-tree or evener, by hinge-joints arranged to give separate free lateral or lateral and vertical motion to each beam for its plows or cultivators and hold them upright in use, substantially as set forth.

ISAAC NEWTON CAUTHORN.

Witnesses:
SAMUEL JACOB WALLACE,
A. H. WILLIAMS.